W.R. PRICE
W.J. FOXWELL
INVENTORS

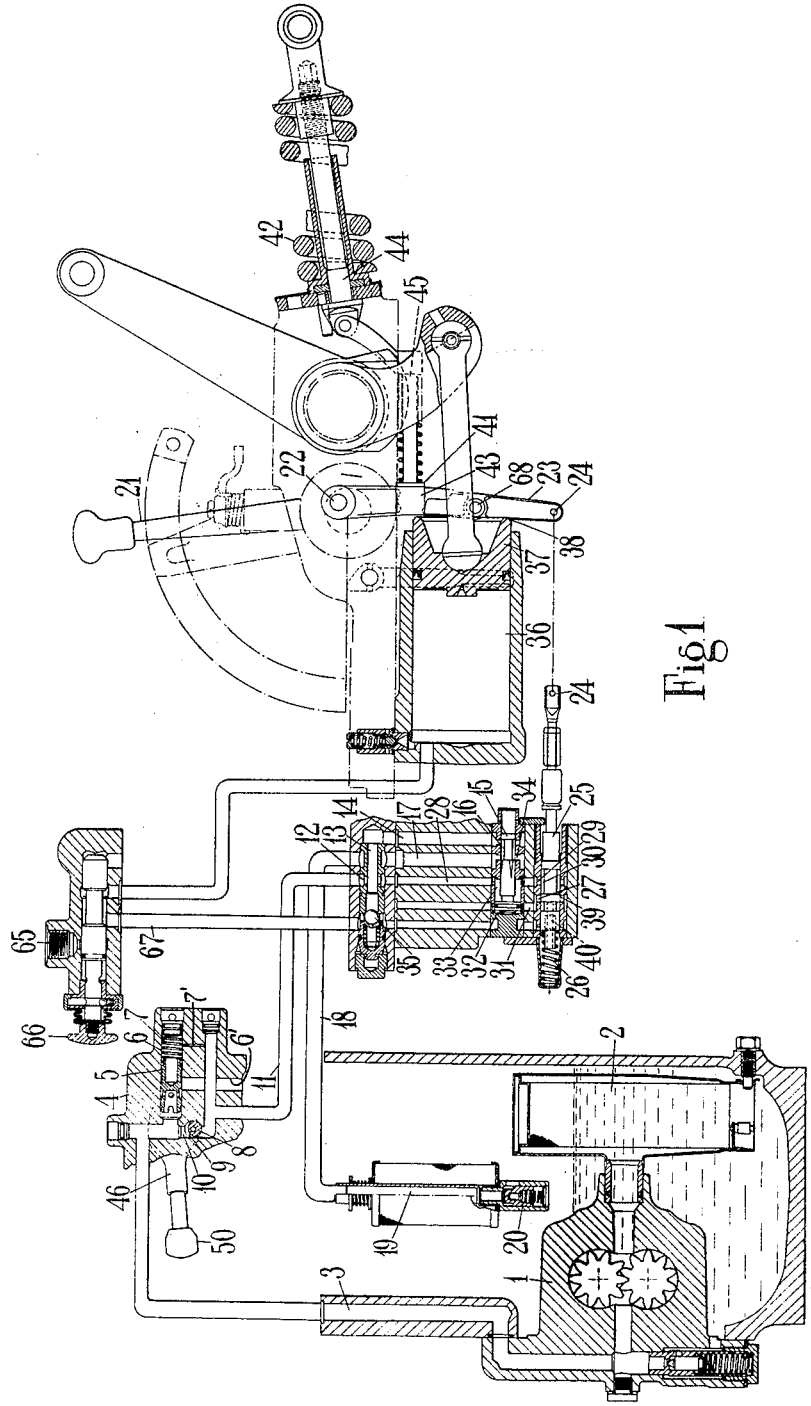

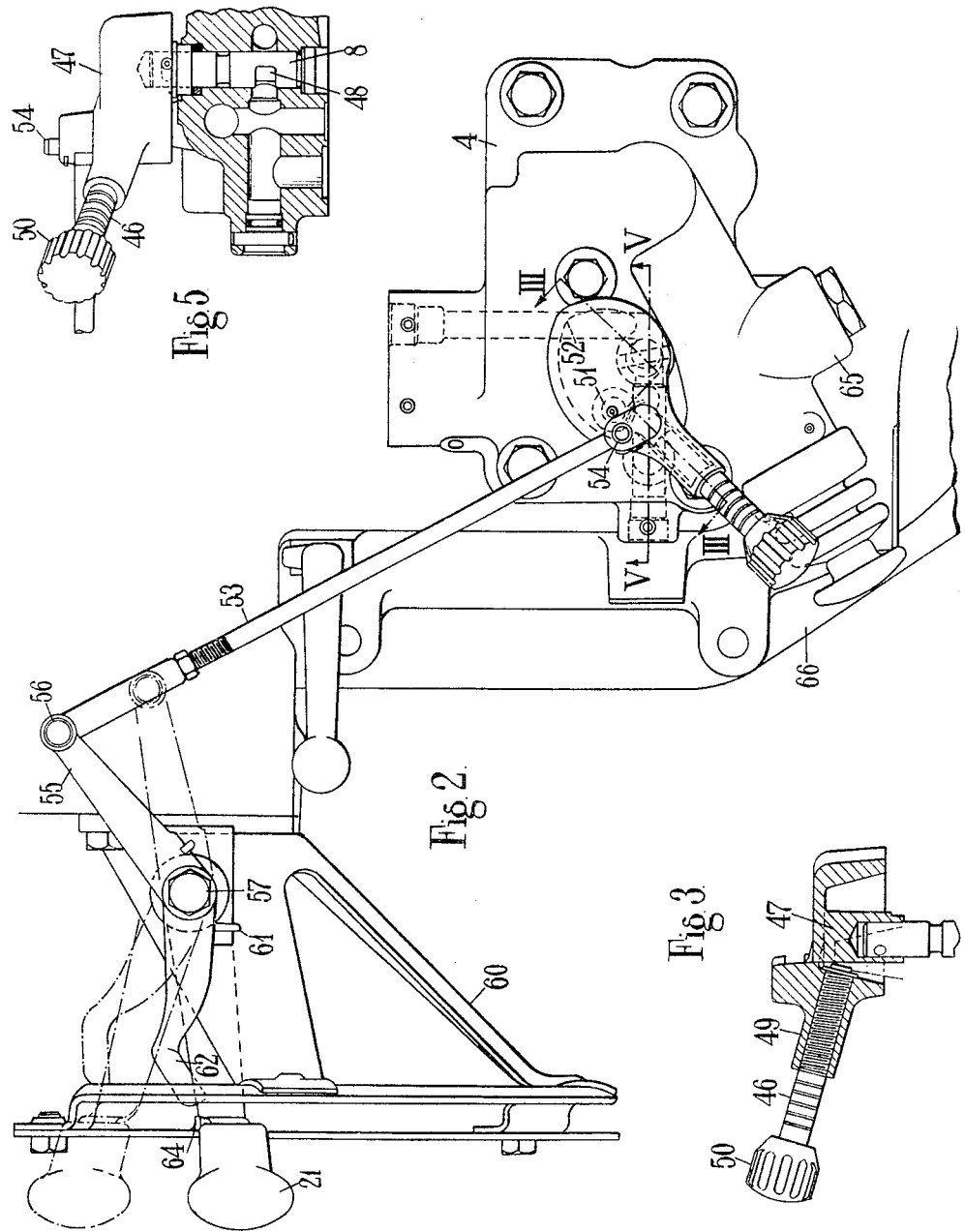

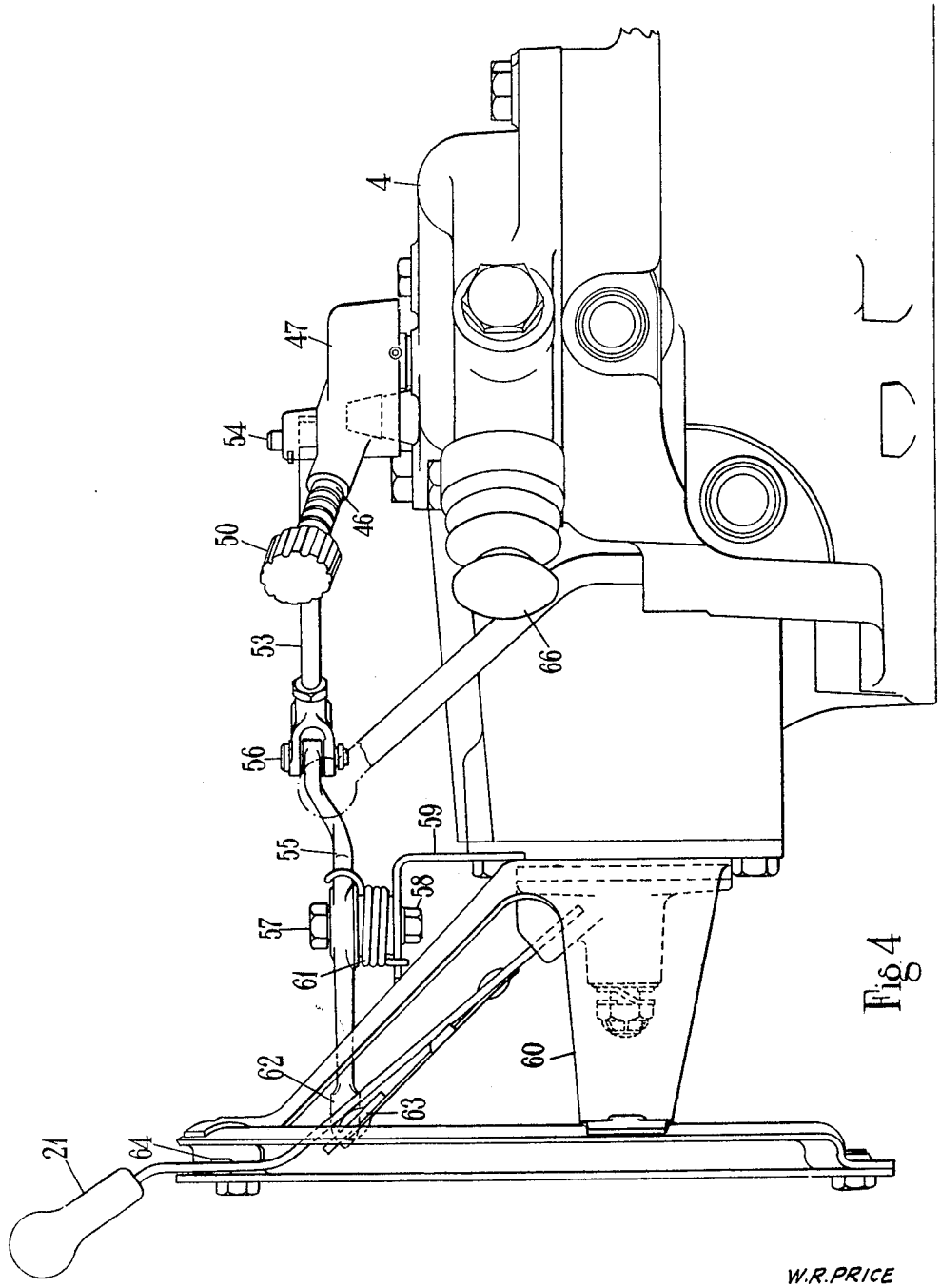

BY *P. F. Hilder*
ATTORNEY

United States Patent Office 3,168,146
Patented Feb. 2, 1965

3,168,146
TRACTOR HYDRAULIC SYSTEMS
William R. Price, Hornchurch, and William J. Foxwell, Romford, England, assignors to Ford Motor Company, Dearborn, Mich.
Filed Nov. 2, 1961, Ser. No. 149,707
Claims priority, application Great Britain, Nov. 4, 1960, 38,002/60
6 Claims. (Cl. 172—7)

This invention relates to tractors of the type having a power liftable implement hitch and a hydraulic cylinder for adjusting the height of the hitch.

Tractors of the power liftable hitch type usually include mechanism on the tractor which senses implement draft and either raises or lowers the implement to maintain a more or less constant draft on the tractor by varying the depth of soil penetration of the implement, e.g. a plow. This system is known as "draft control." Such tractors frequently also are provided with "position control," in which the height of the implement is maintained uniform with respect to the tractor, regardless of draft or depth of soil penetration of the implement.

Such tractors are provided with a source of hydraulic fluid under pressure, usually a pump, and a hydraulic cylinder connected with the hitch. A valve controls flow of fluid from the pressure source to the cylinder and return flow from the cylinder to the sump. This valve is under control of the draft or position sensing device on the tractor so as to more or less maintain any selected amount of draft or selected position by opening the valve, either to admit fluid under pressure to the cylinder or to permit fluid to flow from the cylinder when correction of implement height is necessary. Particularly when plowing in heavy clay soils under draft control, the system requires frequent corrections of height of the implement to maintain uniform draft.

The rate at which the correction is made is determined by the rate at which fluid is admitted to or released from the lift cylinder, which is a function of pump pressure and volume of pump delivery. Many systems utilize a constant delivery pump.

It is desirable to have fewer, smoother implement height corrections while the implement is engaged with the soil as in plowing, which requires a relatively low pump delivery in order to avoid sudden corrections which tend to jar the tractor, giving a so-called "rough ride." At the end of the field, however, it is desirable to provide a greater pump delivery to the cylinder in order that the plow or other implement may be raised from engagement with the ground for turning in the headland at the end of the field without slowing or stopping the tractor.

According to the present invention, a flow control valve is interposed between the pump or other source of fluid under pressure and the lift cylinder for providing a lower rate of flow and, therefore, less violent corrections when operating in either position control or draft control, and an increased rate of flow when lifting the implement from operating position. The flow control valve is automatically positioned for a lower rate of flow upon moving the control lever to drop the implement into working position and automatically positioned for a higher rate of flow upon raising the control lever to lift the implement from working to transport position.

Among the objects of the present invention are to provide a tractor hydraulic system for tractors of the power liftable hitch type in which the rate of lift is greater when lifting to transport position than when correcting height of implement to obtain a constant draft or uniform position; to provide such a system which is automatic in operation and which is controlled responsive to movement of the control lever for raising and lowering the implement; to provide such a system which is economical and dependable in operation; and generally to improve systems of the type described.

Other objects and objections relating to the nature and scope of the invention will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 1 is a flow diagram of the tractor hydraulic and draft control system, certain of the elements of the system being shown in section.

FIGURE 2 is a plan view of the flow control valve, control quadrant, control lever and associated parts.

FIGURE 3 is a vertical section of the upper portion of the flow control valve, taken along the line III—III of FIGURE 2.

FIGURE 4 is an elevation of the flow control valve, control quadrant and associated parts.

FIGURE 5 is an elevation of the flow control valve, the lower portion of the valve being shown in vertical section along the line V—V of FIGURE 2.

FIGURE 1 is a circuit diagram of a tractor hydraulic draft control system illustrating the operation of a flow valve to meter the pump flow either to the main lift cylinder or to a remote cylinder.

Figure 6:
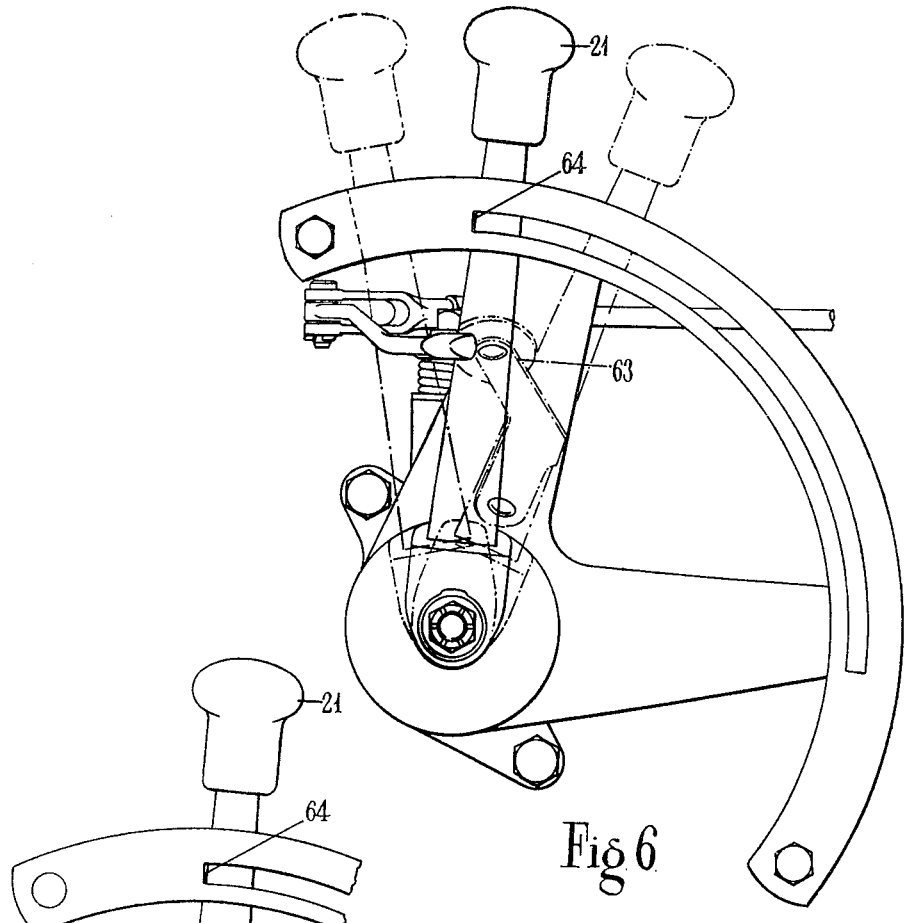
FIGURE 6 is a side elevation of the control lever and quadrant, the control lever being shown in full line position for raising the hitch and in broken line position for lowering the hitch and for operating a remote cylinder. Portions of the linkage connecting the control lever and flow control valve are shown.

A fixed displacement pump 1 draws fluid from reservoir 2 through passage 3 and through the flow control valve 4 and passage 11 and then to servo valve 15. The flow control valve comprises a restrictor 8 which may be rotated to vary the area of restriction 9 in the feed port 10 to vary the volume of fluid delivered to the servo valve. Any excess flow from the pump 1 is returned to sump by means of a bore 6 and intersecting passage 6' communicating with the flow control passage upstream of the restrictor 8. A closely fitting plunger 5 is slidable in the bore 6 and is biased to the left as viewed in FIGURE 1 by a spring 7. A bleed passage 7' connects the bore 6 behind the plunger 5 with a lateral extension of passage 11 to introduce the pressure downstream of the restrictor to the back of the plunger. The arrangement is such that the position of the restrictor 8 determines the volume of fluid flow at any given pressure and movement of the plunger 5 to the right uncovers passage 6' to by-pass any excess flow to sump. The plunger 5 serves as an unload valve to discharge to sump excess flow at pressure only slightly above the pressure in passage 11 at any particular time.

When it is required to lift to the transport position, control lever 21 is moved to the position shown in FIGURE 1. This causes crank 22 to rotate in a clockwise direction and lever 23 to pivot about swivel 24, moving control valve 25 towards the left against the resistance of spring 26. With the uncovering of ports 27 by land 39, fluid is communicated from passage 28 through port 29, across annulus 30 and through passage 31 to the left-hand side of servo valve 15. Due to the differential areas 32 and 33, servo valve 15 moves to the right and closes bypass port 34. The fluid then unseats check valve 35 and pressurized fluid is then supplied to the ram cylinder 36. Piston 37 continues moving to the right until the skirt 38 abuts pin 68, thus moving lever 23 and, with it, control valve 25 to the right until the left-hand edge of land 39 uncovers port 27 and allows fluid blocked in against area 32 of servo valve 15 to be exhausted to reservoir through passage 40. Servo valve 15, under the influence of back pressure 33, will then move to the left and uncover by-pass port 34, allowing fluid to by-pass back to sump.

When the hydraulic system is set on draft control, the depth of plowing is set by the position of control lever 21 along the quadrant 60. This adjusts the gap between abutment 41 and swivel 43. For deep plowing, the control lever is positioned further down the quadrant, thus increasing the gap. When the draft resistance of the implement increases beyond the degree determined by position of the control lever 21, the additional compressive force in the top link causes the reaction spring 42 to be compressed still further. In turn, the plunger 44 and the rod 45 move to the left and, if the force is sufficiently high, the gap is closed and abutment 41 displaces swivel 43, moving lever 23 clockwise, which will move the control valve 25 to the lift position and cause the hydraulic system to make a correction. The implement is thus slightly lifted in order to reduce the draft resistance to a value which will enable the system to return to neutral. A decrease in draft causes lever 23 to move valve 25 in the opposite direction, releasing oil from the cylinder 36 and permitting the hitch to drop.

In order to vary the flow of oil to the cylinder 36 to suit different conditions of operation, the flow valve 4 illustrated in FIGURES 2 and 4 is provided with an adjustable control 46 for positioning the moveable restrictor 8. This consists of a casing in the form of an inverted cap 47, which is pinned to restrictor 8 for rotating the restrictor between fully opened and partially closed position. A boss 49, offset to restrictor 8, is tapped to accept a threaded rod 50, the inner end of which creates an adjustable abutment with stop 51 and is so arranged that as the rod 50 is screwed further out, allowing the cap 47 to turn further in a clockwise direction, the chordally extending opening 48 on restrictor 8 will cause the area of restriction 9 to be reduced, thus decreasing the flow of fluid to be supplied to the ram cylinder. When the cap 47 is rotated in a counter-clockwise direction (FIGURE 2), the internal face 52 of cap 47 will strike stop 51. At this point, the restriction is fully open and pump output will be unrestricted. It can be seen, therefore, that once the metered supply of fluid has been correctly set by rotation of the lever either one way or the other, either maximum pump output (for lifting into transport) or metered flow for certain working conditions (such as deep plowing in heavy soil) is achieved immediately.

Lowering of the hydraulic lift is accomplished by the movement of the control valve 25 to the right as viewed in FIGURE 1. This movement of the control valve opens passage 67 to the reservoir through passage 40.

In order to obviate the necessity of using two levers when raising to transport or dropping to operating position at the end and beginning of a furrow, a connection link has been devised between the control lever and the flow valve in such a way that when the control lever is moved to the lift position, the flow reducing effect of the flow valve is immediately neutralized; and when the control lever is moved down the quadrant, the flow valve is again conditioned to deliver the restricted amount of fluid suitable for the operation being performed.

Figure 7:
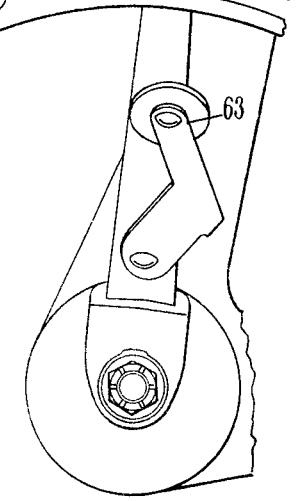
FIGURE 7 is a side elevation of the control lever and associated parts, a portion of the quadrant being shown.

This arrangement consists of a link or rod 53 which is pivotally connected to the flow valve cap 47 by pin 54 at the one end and at the other end to bell crank lever 55 by pin 56. The bell crank lever 55 is arranged to pivot about bolt 57 which, in turn, is clamped by nut 58 to a bracket 59 welded to quadrant 60. A torsion spring 61, bearing against the bracket 59 and bell crank lever 55 urges the bell crank lever 55 in a counter-clockwise direction as viewed in FIGURE 2. The other end of the bell crank lever 55 is provided with a face 62 which abuts an extension or abutment 63 on the control lever 21 as shown in FIGURE 6 when the lever 21 is moved to the lift position. When, therefore, the operator moves the control lever up to stop 64 at the end of the field in order to lift the implement to the transport position, the control lever will rotate bell crank lever 55 in a clockwise direction against the bias of torsion spring 61. By means of link 53, the cap 74 will then be rotated in a counter-clockwise direction until the internal face 52 of cap 47 comes against a stop 51. The flow valve will then be in the full flow position. Conversely, when the control lever is moved down the quadrant 60 to drop the implement into operating position, the torsion spring 61 will urge the bell crank lever 55 in a counter-clockwise direction and return the flow valve to the rate of flow which has been set by rod 50. If, for any reason, it is desired not to increase flow rate upon lifting the lever 21, the abutment 63 may be positioned as indicated in FIGURE 7.

In order to operate external hydraulic equipment connected to tapping 65, the control lever is moved up to stop 64, allowing the hydraulic system to be neutralized by the piston moving the lever 23 to the left. The isolating valve 66 is then moved to the left so that the tapping 65 is then in communication with passage 67 and, hence, in direct communication with the valve. To obtain a lift, the control lever is moved beyond stop 64. In order to compensate for this extra movement in relation to operation of the flow valve, the spring loaded abutment 63 is deflected and moved to the position shown in FIGURE 7 so that contact with the face 62 of bell crank lever 55 is made by the side of the control lever.

Various modifications may be made within the scope of the invention.

We claim:

1. In a tractor having a 3-point implement hitch and a hydraulic system, including a pump and a lift cylinder, for lifting and lowering the hitch, means for sensing draft on an implement attached to the hitch, a valve for conrtolling passage of hydraulic fluid to and from said lift cylinder responsive to sensed draft on the implement to maintain a more or less uniform draft, a control lever for operating the valve to raise and lower the hitch to move the implement between operating and non-operating position, a flow control valve interposed between the pump and the cylinder and manually adjustable for supplying fluid to the cylinder at a maximum rate of flow and at selected rates below said maximum rate, and a mechanical linkage located in the path of movement of the control lever and connected with the flow control valve, said linkage being independent of the draft sensing means and engaged and actuated solely by movement of the control lever to raise the implement to nonoperating position, and actuation of said linkage moving the flow control valve to provide maximum rate of flow.

2. In a tractor having a 3-point implement hitch and a hydraulic system, including a pump and a lift cylinder, for lifting and lowering the hitch, means for sensing draft on an implement attached to the hitch, a valve for controlling passage of hydraulic fluid to and from said lift cylinder responsive to sensed draft on the implement to maintain a more or less uniform draft, a control lever for operating the valve to raise and lower the hitch to move the implement between operating and non-operating position, a flow control valve interposed between the pump and the cylinder and manually adjustable for supplying fluid to the cylinder at a maximum rate of flow and at a rate below said maximum rate, a mechanical linkage located in the path of movement of the control lever and connected with the flow control valve, said linkage being independent of the draft sensing means and engaged and actuated solely by movement of the control lever to raise the implement to nonoperating position, and actuation of said linkage adjusting the flow control valve to provide maximum rate of flow, and a spring for readjusting the flow control valve for the lesser rate of flow upon moving the lever to lower the implement into operating position.

3. In a tractor having an implement hitch and a hydraulic system, including a pump and a lift cylinder, for lifting and lowering the hitch, means for sensing draft on an implement attached to the hitch, a valve for controlling passage of hydraulic fluid to and from said lift cylinder responsive to sensed draft on the implement to maintain a more or less uniform draft, a control lever for operating the valve to raise and lower the hitch to move the implement between operating and non-operating position, a flow control valve interposed between the pump and the cylinder and manually adjustable for supplying fluid to the cylinder at varying rates of flow, and a mechanical linkage located in the path of movement of the control lever and connected with the flow control valve, said linkage being independent of the draft sensing means and engaged and actuated solely by movement of the control lever to raise the implement to nonoperating position, and actuation of said linkage moving the flow control valve to provide increased rate of flow.

4. In a tractor having an implement hitch and a hydraulic system, including a pump and a lift cylinder, for lifting and lowering the hitch, means for sensing draft of an implement attached to the hitch, a valve for controlling passage of hydraulic fluid to and from said lift cylinder, linkage connecting the draft sensing means with the valve to operate the valve responsive to sensed draft on the implement to maintain a more or less uniform draft, manually operated control means for operating the valve to raise and lower the hitch to move the implement between operating and non-operating position, a flow restrictor interposed between the pump and the cylinder, said flow restrictor being manually adjustable to meter flow to the cylinder at a maximum rate and at selected rates below the maximum, and linkage independent of the linkage connecting the draft sensing means and lift cylinder control valve and operated solely by operation of the manually operated control means to raise the implement to non-operating position for moving the flow restrictor to position for maximum flow.

5. In a tractor as claimed in claim 4, a return passage immediately upstream of the restrictor for passing to sump at a pressure slightly above the pressure on the downstream side of the restrictor excess flow from the pump.

6. In a tractor having an implement hitch and a hydraulic system, including a pump and a lift cylinder, for lifting and lowering the hitch, means for sensing draft of an implement attached to the hitch, a valve for controlling passage of hydraulic fluid to and from said lift cylinder, linkage connecting the draft sensing means with the valve to operate the valve responsive to sensed draft on the implement to maintain a more or less uniform draft, manually operated control means for operating the valve to raise and lower the hitch to move the implement between operating and non-operating position, a flow restrictor interposed between the pump and the cylinder, said flow restrictor being manually adjustable to meter flow to the cylinder at a maximum rate and at selected rates below the maximum, and linkage independent of the linkage connecting the draft sensing means and lift cylinder control valve and operated solely by operation of the manually operated control means to raise the implement to non-operating position for moving the flow restrictor to position for maximum flow, and means to readjust the flow control valve for the selected lesser rate of flow upon moving the control means to lower the implement.

References Cited in the file of this patent

UNITED STATES PATENTS

| | | |
|---|---|---|
| 2,102,865 | Vickers | Dec. 21, 1937 |
| 2,611,306 | Strehlow et al. | Sept. 23, 1952 |
| 2,679,199 | Strehlow | May 25, 1954 |
| 2,714,346 | Valin | Aug. 2, 1955 |
| 2,804,814 | Czarnocki | Sept. 3, 1957 |
| 2,851,938 | Giertz et al. | Sept. 16, 1958 |
| 3,003,568 | Merritt et al. | Oct. 10, 1961 |
| 3,013,617 | Heckenkamp | Dec. 19, 1961 |